Oct. 14, 1969  E. M. HALVAJIAN  3,472,332
COMBINATION IMPACT CUSHIONING BUMPER
AND AUTOMATIC ROADWAY BRAKE
Filed Oct. 6, 1967  4 Sheets-Sheet 1

INVENTOR.
EDWARD M. HALVAJIAN

BY
Beehler & Arant
ATTORNEYS

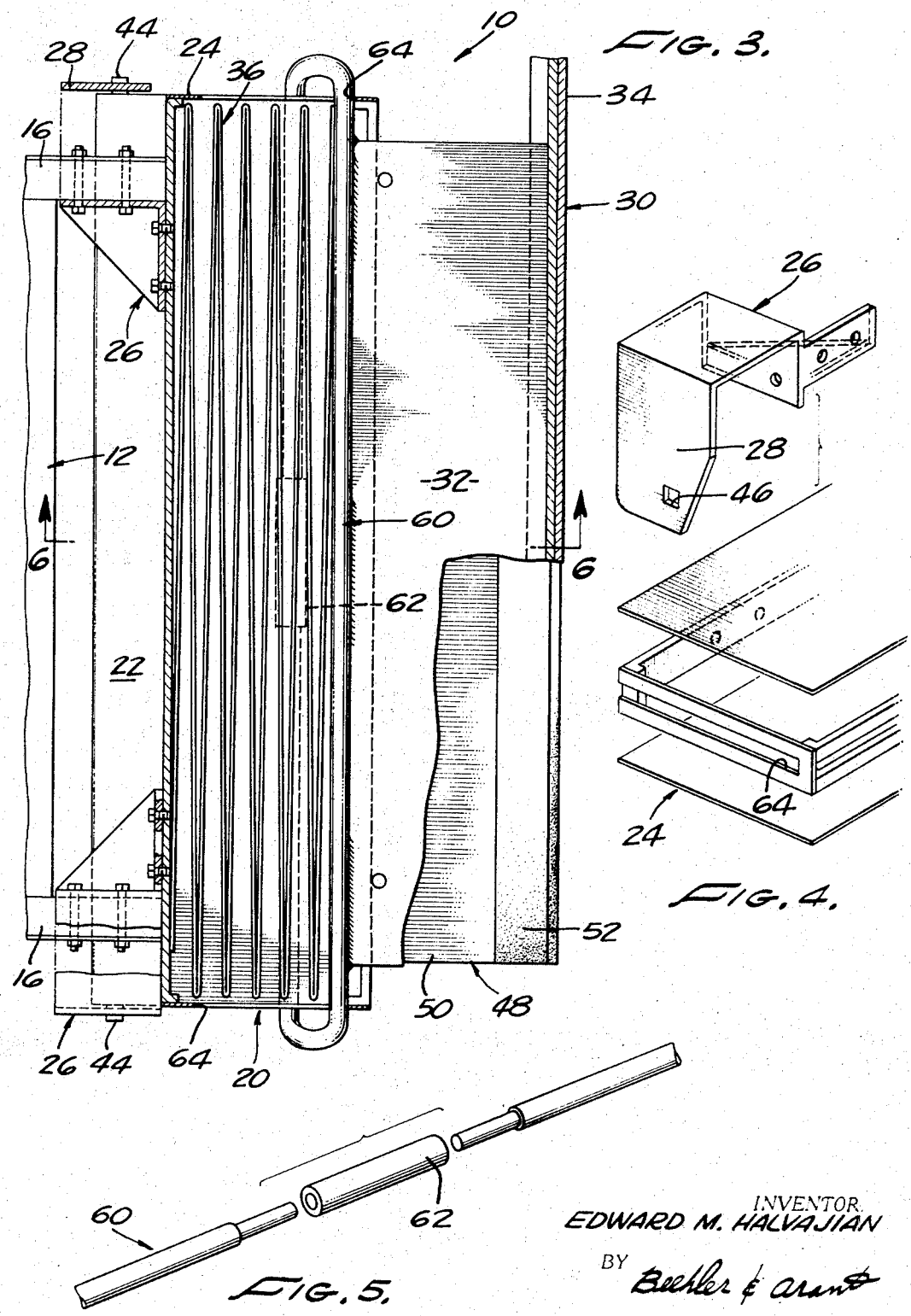

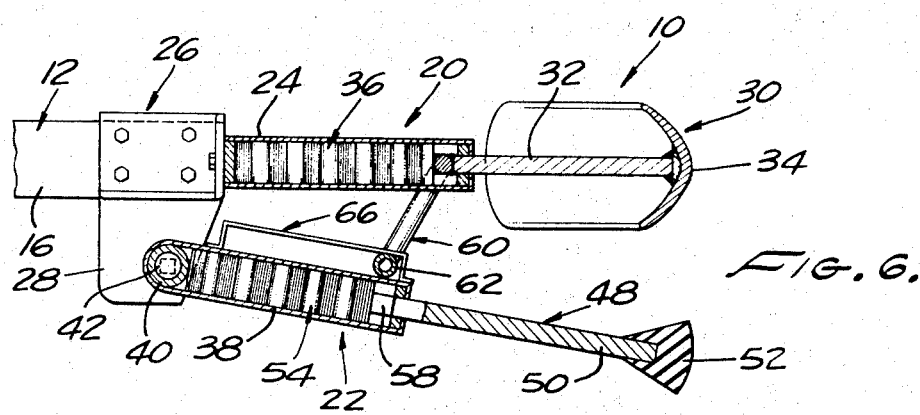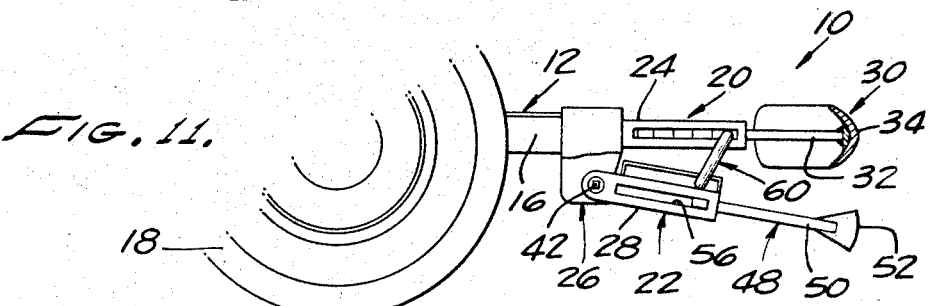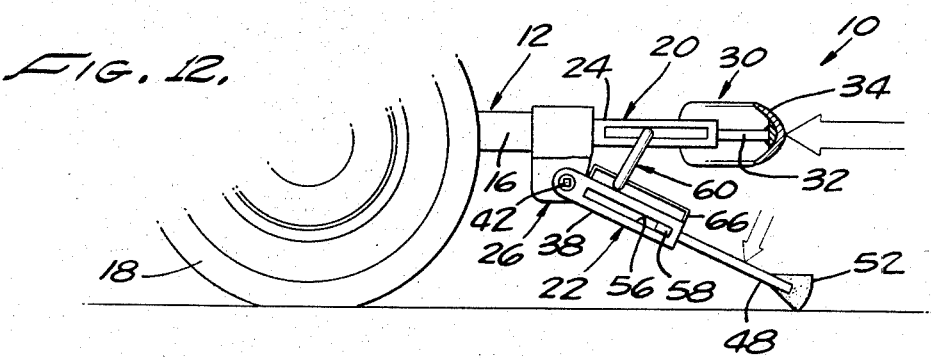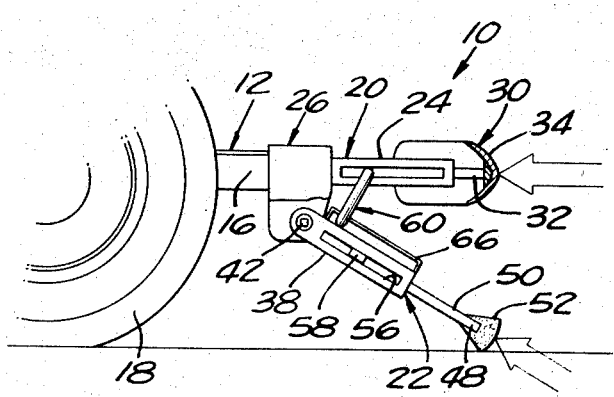

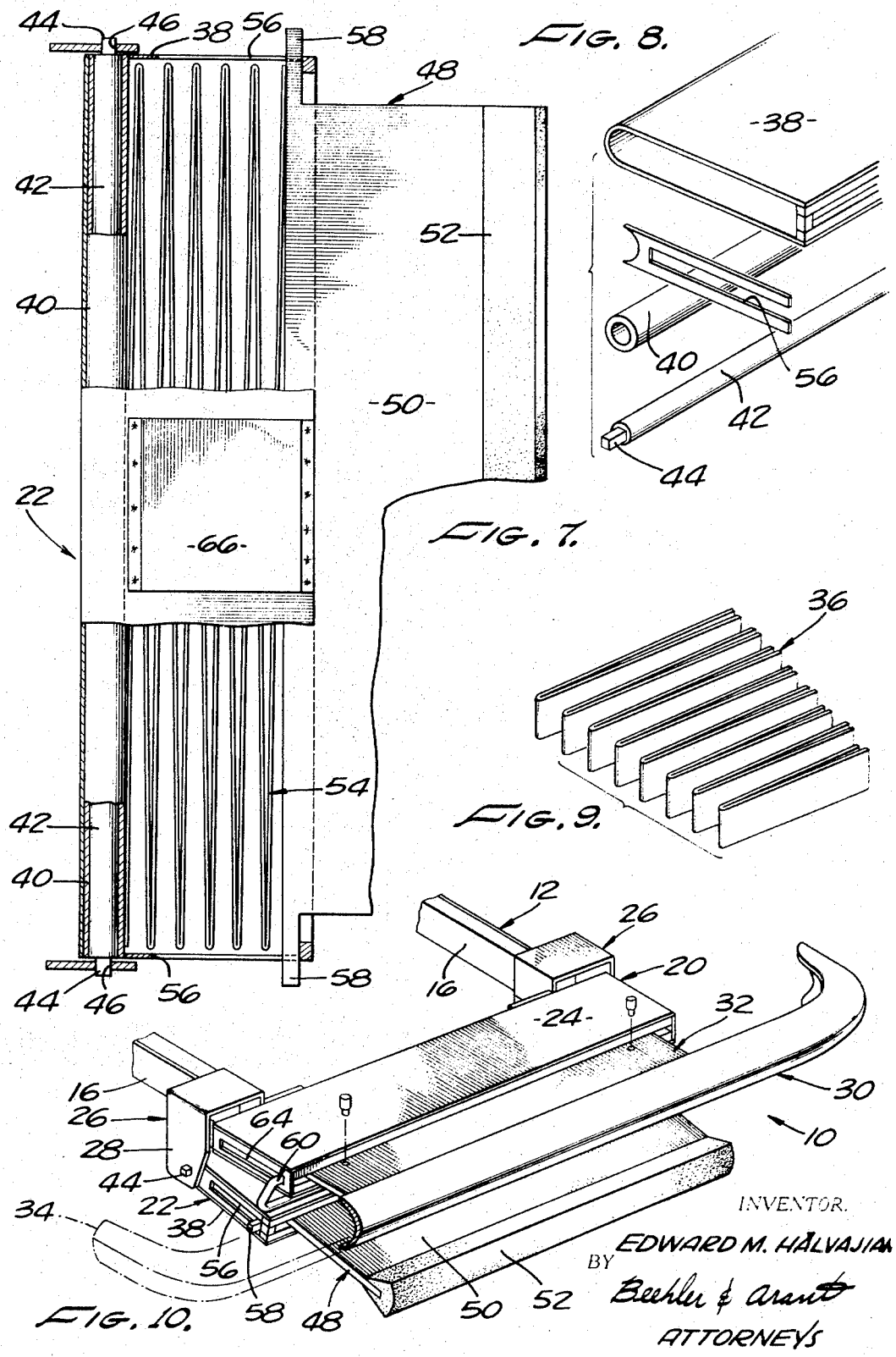

United States Patent Office 3,472,332
Patented Oct. 14, 1969

3,472,332
COMBINATION IMPACT CUSHIONING BUMPER
AND AUTOMATIC ROADWAY BRAKE
Edward M. Halvajian, 3170 W. 11th St.,
Los Angeles, Calif. 90006
Filed Oct. 6, 1967, Ser. No. 673,319
Int. Cl. B60k 33/02; B60r 19/04, 19/08
U.S. Cl. 180—93    4 Claims

ABSTRACT OF THE DISCLOSURE

A combination impact cushioning bumper and brake device to be attached to the front end of an automotive vehicle, the device having an upper bumper mechanism including a bumper unit which is retractable rearwardly under impact against the yielding resistance of an energy absorbing means, and a lower vertically swingable brake mechanism which is released to swing downwardly into frictional braking contact with the roadway in response to retraction of the bumper unit.

BACKGROUND OF THE INVENTION

Field of the invention

This invention relates generally to automatic vehicles. More particularly, the invention relates to a combination impact cushioning bumper and automatic roadway brake device for automotive vehicles.

Prior art

The prior art is replete with a wide assortment of impact cushioning, automotive vehicle bumpers and other automotive safety devices of this general class for cushioning the impact of a vehicle with another object. Most if not all of the safety devices of this class, however, are subject to one deficiency which this invention seeks to overcome. The deficiency referred to resides in the fact that the existing safety devices do not produce any automatic braking action, at impact, between the vehicle and the roadway. As a consequence, virtually the total kenetic energy of the vehicle at impact must be absorbed by the impact cushioning bumper. The existing bumpers of this type, however, are not designed to nor capable of withstanding and effectively cushioning the relatively high intensity impacts normally encountered in front end collisions, and the like.

SUMMARY OF THE INVENTION

This invention provides a combination impact cushioning bumper and automatic roadway brake device which overcomes the above noted disadvantage of the existing impact cushioning bumpers. To this end, the present device is adapted to be mounted on the front end of an automotive vehicle and is equipped with an upper impact cushioning bumper mechanism and a lower roadway brake mechanism. The upper bumper mechanism has a bumper unit which is retractable rearwardly under impact against the yielding resistance of an energy absorbing means. This energy absorbing means is effective, during retraction of the bumper unit under impact, to dissipate the energy of the impact throughout the stroke of the bumper unit. The lower brake mechanism includes the forward friction brake shoe and is pivotally mounted for swinging of the brake shoe between an elevated position of travel and a lower braking position, wherein the shoe is disposed for frictional braking engagement with the roadway. The bumper mechanism and brake mechanism are operatively connected in such a way that the brake mechanism is normally retained in its elevated position and is automatically released to swing downwardly into braking engagement with the roadway in response to retraction of the bumper unit under impact. Thus, in the event of a front end impact involving an automotive vehicle mounting the present device, a substantial portion of the kinetic energy of the vehicle at impact is absorbed by the frictional braking contact of the brake shoe with the roadway, and the remaining kinetic energy which must be absorbed by the energy cushioning bumper is correspondingly reduced.

BRIEF DESCRIPTION OF THE DRAWINGS

FIGURE 3 is an enlarged section taken on line 3—3 in FIGURE 2;

FIGURE 4 is a fragmentary exploded perspective view of certain components of the present device;

FIGURE 5 is an exploded fragmentary perspective view of certain other elements of the device prior to assembly;

FIGURE 6 is a section taken on line 6—6 in FIGURE 3;

FIGURE 7 is a section taken on line 7—7 in FIGURE 2;

FIGURE 8 is an exploded fragmentary perspective view of certain elements of the device;

FIGURE 9 is a fragmentary perspective view illustrating an energy absorbing means embodied in the device;

FIGURE 10 is a perspective view, partly broken away, of the present device when installed on the frame of an automotive vehicle; and FIGURES 11 through 13 illustrate the operation of the present device.

DESCRIPTION OF THE PREFERRED EMBODIMENT

Figure 1:
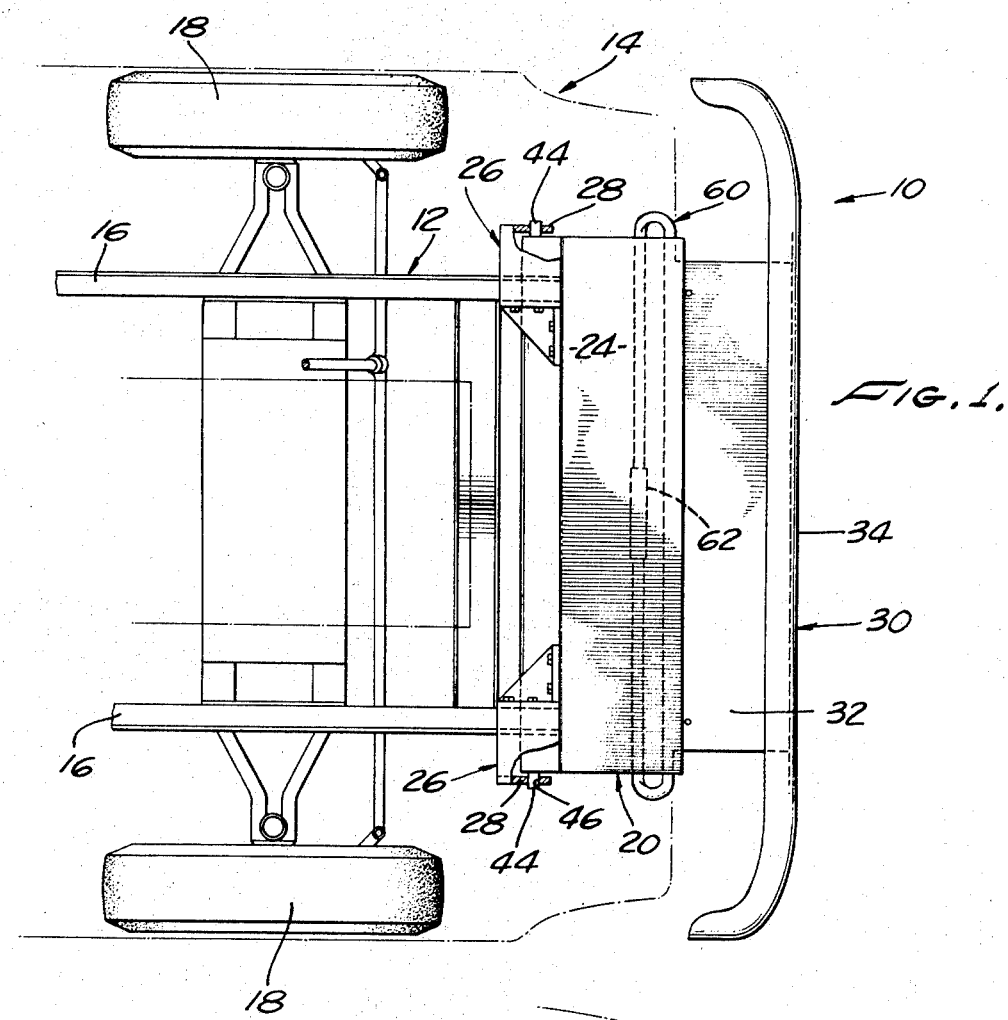
FIGURE 1 is a fragmentary top plan view of the front end of the chassis of an automotive vehicle mounting the present combination bumper and brake device.
Figure 2:
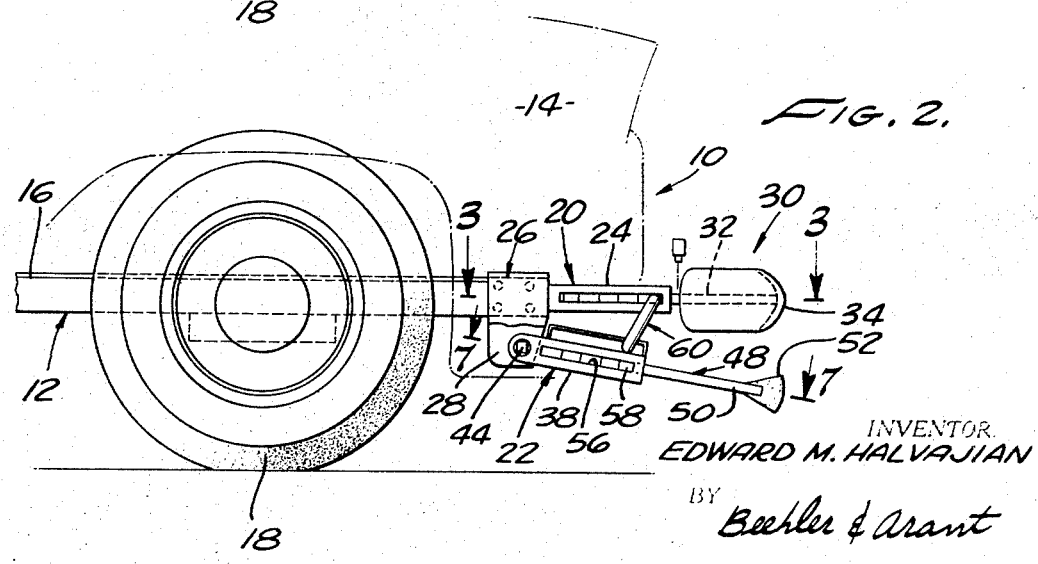
FIGURE 2 is a side elevation of the structure illustrated in FIGURE 1.

Turning now to these drawings, there is illustrated a combination impact cushioning bumper and automatic roadway brake 10 according to the invention mounted on the chassis 12 of an automotive vehicle 14. Vehicle 14 is conventional and thus need not be explained in detail. Suffice it to say that the vehicle chassis 12 includes a pair of longitudinal frame members 16, the front ends of which extend forwardly of the front vehicle wheels 18. The bumper and brake device 10 is secured to the front ends of the frame member 16.

In general terms, the device 10 comprises an upper impact cushioning bumper mechanism 20 and a lower roadway brake mechanism 22. The upper bumper mechanism 20 has a rigid, hollow rectangular frame 24. Bolted or otherwise rigidly attached to the rear longitudinal edge of this frame are mounting brackets 26 for attaching the frame to the front ends of the longitudinal frame members 16 of the vehicle chassis 12. One of the mounting brackets is illustrated in detail in FIGURE 4. The mounting brackets 26 are mirror images of one another and one bracket is illustrated in detail in FIGURE 4. Accordingly, it is unnecessary to describe these brackets in detail. Suffice it to say that the brackets include outer depending flanges 28 which project below the vehicle frame members 16, when the brackets are installed in these members. It will be observed that when the present bumper and brake device 10 is installed on the vehicle 14, the bumper frame 24 is disposed in a horizontal plane and extends across the front end of the vehicle at normal bumper level.

The bumper frame 24 mounts a bumper unit 30. This bumper unit includes the rear load bearing unit or plate 32 and a front bumper bar 34 welded or otherwise rigidly secured to the front edge of the plate, as shown. The bumper bar 34 has a normal bumper length and extends a distance beyond opposite ends of the plate 32, as may be best observed in FIGURE 10. Bumper plate 32 extends rearwardly to the interior of the bumper frame 34 through a longitudinal slot in the front wall frame. It is evident at this point, therefore, that the bumper unit 30 is supported by the bumper frame 24 for rearward retraction relative to the frame. Contained within the frame 24 are energy absorbing means 36. In this instance, the energy absorbing means comprises a leaf spring which is bent into the generally serpentine configuration illustrated in FIGURE 9. This spring yieldably retains the bumper unit 30 in its forward position of FIGURES 6 and 11 relative to the bumper frame 24. In addition, in the event that the bumper unit is subjected to a rearward impact which tends to drive the unit rearwardly into the bumper frame, a spring 36 yieldably resists the retraction in such a way as to absorb the energy of and thereby cushion the impact.

The lower roadway brake mechanism 22 has a hollow, generally rectangular frame 38 similar to and coextensive with the bumper frame 24. Welded or otherwise rigidly secured within this frame, along its rear edge, of a bearing tube or sleeve 40. A journal shaft 42 is rotatably fitted within the bearing sleeve 40 and has square ends 44 which project axially beyond the ends of the sleeve. Brake frame 38 is disposed with its rear edge between the depending flanges 28 of the mounting brackets 26. The squared ends 44 of the brake frame journal shaft 42 fit within correspondingly squared openings 46 in the bracket flanges. It is evident at this point, therefore, that the brake frame 38 is pivotally supported on the mounting brackets 26 for vertical swinging movement about the axis of the journal shaft.

Extending forwardly from the brake frame 38 is a brake unit 48 including a strut or plate 50. Brake plate 50 extends rearwardly to the interior of the brake frame 38 through a longitudinal slot in the front wall of this frame. Secured to and coextensive with the front edge of the plate is a brake shoe 52 of friction material. Brake frame 38 contains an energy absorbing means 54 which, in this instance, is a spring like that employed for the bumper energy absorbing means 36. Spring 54 urges the brake unit 48 to and yieldably retains this unit in its forward position of FIGURE 6. Extending from opposite ends of the brake plate 50, and through slots 56 in the opposite end walls of the brake frame 38, are stop shoulders 58. These stop shoulders are engagable with the front ends of the brake frame slots 56 to limit forward extension of the brake plate 50 under the action of its spring 54.

The roadway brake mechanism 22 is vertically swingable between its elevated traveling position of FIGURES 6 and 11, wherein the brake shoe 52 is elevated clear of the roadway surface, and its lower braking position of FIGURES 12 and 13, wherein the brake shoe is disposed for frictional engagement with the roadway surface. The brake mechanism is operatively connected to the bumper mechanism, by coupling means 60. Coupling means 60 are effective to retain the braking mechanism 22 in its elevated traveling position under normal travel conditions and to release the brake mechanism for downward swinging movement to its braking position in response to the traction of the bumper unit 30 under impact. To this end, the illustrated coupling means 60 comprise a rigid, generally long narrow loop-shaped link which is fashioned from a large diameter idle rod. As shown in FIGURE 5, the lower inturned ends of this rod are reduced in diameter to receive a camming roller 62. This camming roller is captivated on the reduced ends of the rod 60 when these ends are turned inwardly to form the rod in the illustrated loop shape. The upper horizontal cross member of the rod 60 is welded or otherwise rigidly attached to the rear edge of the bumper plate 32 and extends lengthwise through slots 64 in the end walls of the bumper frame 24. It will be understood, therefore, that engagement of the upper cross member of the rod 60 with the front end walls of the slots 64 limits forward extension of the bumper unit 30 by its spring 36. The lower inturned ends of the rod 60, and the camming roller 62 mounted on these ends, extend across the under side of a ramp wall 66 secured to the upper surface of the brake frame 38. The present bumper and brake device is constructed and arranged in such a way that when the bumper unit 30 occupies its forward position of FIGURE 6, the camming roller 62 is located adjacent the front edge of the ramp wall 66, and this wall slopes downwardly in the forward direction, away from the path of rearward retraction movement of the bumper unit 30 relative to the bumper frame 24. In this position of the parts, the coupling link or rod 60 supports the brake mechanism 30, and particularly its brake shoe 52, in the elevated traveling position of FIGURE 6. Rearward retraction of the bumper unit 30 relative to the bumper frame 34 causes rearward movement of the camming roller 62 relative to the brake frame ramp wall 66. Because of the slope of this wall, such rearward movement of the roller releases the brake mechanism 22 to swing downwardly to its initial braking position of FIGURE 12. In this initial braking position, the brake shoe 52 is disposed in frictional braking contact with the roadway surface.

The operation of the present combination impact cushioning bumper and automatic roadway brake device is believed to be obvious from the preceding description. Thus, under normal travel conditions, the bumper unit 30 occupies its forward position and brake mechanism 22 occupies its elevated traveling position illustrated in FIGURES 6 and 11. In this elevated position, the brake shoe 52 is raised clear of the roadway surface so as to not inhibit forward movement of the vehicle. In the event of an impact against the bumper unit 30 which drives or retracts the latter rearwardly relative to its frame 24, the energy cushioning means for spring 36 yieldably resists retraction of the unit in such a way as to absorb the energy of and thereby cushion the impact throughout the retraction stroke of the bumper unit. Rearward retraction of the bumper unit also automatically releases the brake mechanism 22 to swing downwardly to its initial braking position of FIGURE 12. The forward momentum of the vehicle then causes the brake frame 38 to effectively telescope forwardly over the brake unit 48. Such telescoping movement of the brake unit and frame is yieldably resisted by the energy absorbing means or spring 54 which cushions the impact created by initial engagement of the brake shoe with the roadway surface.

It is now evident, therefore, that the present invention provides a combination bumper and brake device which is effective, upon impact, to produce an automatic braking action between the vehicle and the roadway surface. Accordingly, a large portion of the kinetic energy of the vehicle and impact is absorbed by the frictional braking contact of the brake unit with the roadway surface. The portion of the vehicle energy which must be absorbed by the bumper mechanism 20 is thereby effectively reduced.

The invention has been described in considerable detail in order to comply with the patent laws by providing a full public disclosure of at least one of its forms.

Having described the invention, what is claimed as new in support of Letters Patent is:

1. A combination impact cushioning bumper and automatic roadway brake device for an automotive vehicle comprising:
   an upper bumper mechanism adapted to be mounted on the front end of said vehicle approximately at normal level and including a rearwardly retractable bumper unit, and energy absorbing means for yieldably retaining said unit in a forward position and yieldably resisting rearward retraction of said unit under impact, a lower brake mechanism including a brake unit having a forward brake shoe, and means pivotally mounting said brake mechanism on said bumper mechanism for vertical swinging movement of said brake mechanism between an elevated position of travel wherein said brake shoe is disposed to clear the roadway surface, and a lower braking position wherein said brake shoe is disposed for frictional braking contact with said roadway surface, and coupling means operatively connecting said bumper mechanism and brake mechanism for retaining said brake mechanism in its elevated position of travel when said bumper unit occupies its forward position and releasing said brake mechanism to swing downwardly to its braking position in response to retraction of said bumper unit under impact.

2. A device according to claim 1 wherein:

said brake unit is retractable rearwardly under the impact occasioned by initial braking engagement of said brake shoe with the roadway surface, and said brake mechanism further comprises energy cushioning means for yieldably retaining said brake unit in a forward position and yieldably resisting rearward retraction of said brake unit under impact.

3. A device according to claim 2 wherein:

said bumper mechanism further comprises a hollow frame receiving said bumper unit through a slot in the front side of said frame and supporting said bumper unit for retraction thereof relative to said frame, said first mentioned energy absorbing means comprise a spring within and active between said frame and bumper unit, said brake mechanism further comprises a brake frame receiving said brake unit through a slot in the front side of said brake frame, and said second mentioned energy absorbing means comprise a spring disposed within and active between said brake frame and said brake unit.

4. A combination impact cushioning bumper and automatic roadway brake device for an automotive vehicle comprising:

an upper bumper mechanism adapted to be mounted on the front end of said vehicle approximately at normal level and including a rearwardly retractable bumper unit, a hollow frame receiving said bumper unit through a slot in the front side of said frame and supporting said bumper unit for retraction thereof in a rearwardly direction relative to said frame, and energy absorbing means comprising a spring within and active between said frame and bumper unit for yieldably retaining said bumper unit in a forward position and yieldably resisting rearward retraction thereof under impact;

a lower brake mechanism including a brake unit having a forward brake shoe, a brake frame receiving said brake unit through a slot in the front side of said brake frame, means pivotally mounting said brake mechanism on said bumper mechanism for vertical swinging movement of said brake mechanism between an elevated position of travel wherein said brake shoe is disposed to clear the roadway surface and a lower braking position wherein said brake shoe is disposed for frictional braking contact with said roadway surface, and energy cushioning means comprising a spring disposed within and active between said brake frame and said brake unit for yieldably retaining said brake unit in a forward position and yieldably resisting rearward retraction of said brake unit under impact; and coupling means operatively connecting said bumper mechanism and brake mechanism for retaining said brake mechanism in its elevated position of travel when said bumper unit occupies its forward position and releasing said brake mechanism to swing downwardly to its braking position in response to retraction of said bumper unit under impact, said coupling means comprising a coupling link rigidly secured to said bumper unit and having a lower camming element engaging a downwardly presented ramp surface on said brake mechanism, and said ramp surface sloping downwardly in the forward direction away from the path of rearward retraction movement of said bumper unit relative to said bumper frame when said bumper unit occupies this forward position and in such a way that engagement of said camming element with the forward position of said ramp surface supports said brake mechanism in its elevated travel position and rearward movement of said camming element along said ramp surface with said bumper unit releases said brake mechanism to swing downwardly under the force of gravity to its braking position.

References Cited

UNITED STATES PATENTS

| 1,401,774 | 12/1921 | Halpern | 180—93 |
| 1,419,366 | 6/1922 | Fial | 180—93 |
| 2,066,468 | 1/1937 | Grigas | 180—93 |
| 3,349,865 | 10/1967 | Deutsch | 180—93 |

KENNETH H. BETTS, Primary Examiner

U.S. Cl. X.R.

188—5; 293—6